G. N. SPENCER.
AUTOMATIC HAY RAKE.
APPLICATION FILED JULY 31, 1919.
1,356,230.
Patented Oct. 19, 1920.
6 SHEETS—SHEET 5.
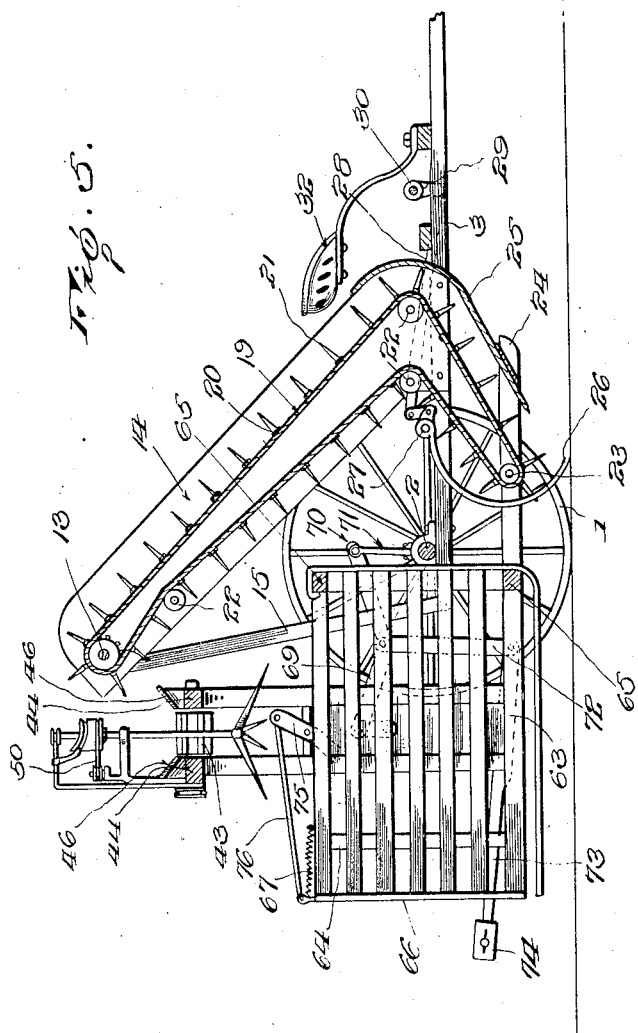
Inventor
G. N. Spencer
by Lacey & Lacey
Attys.

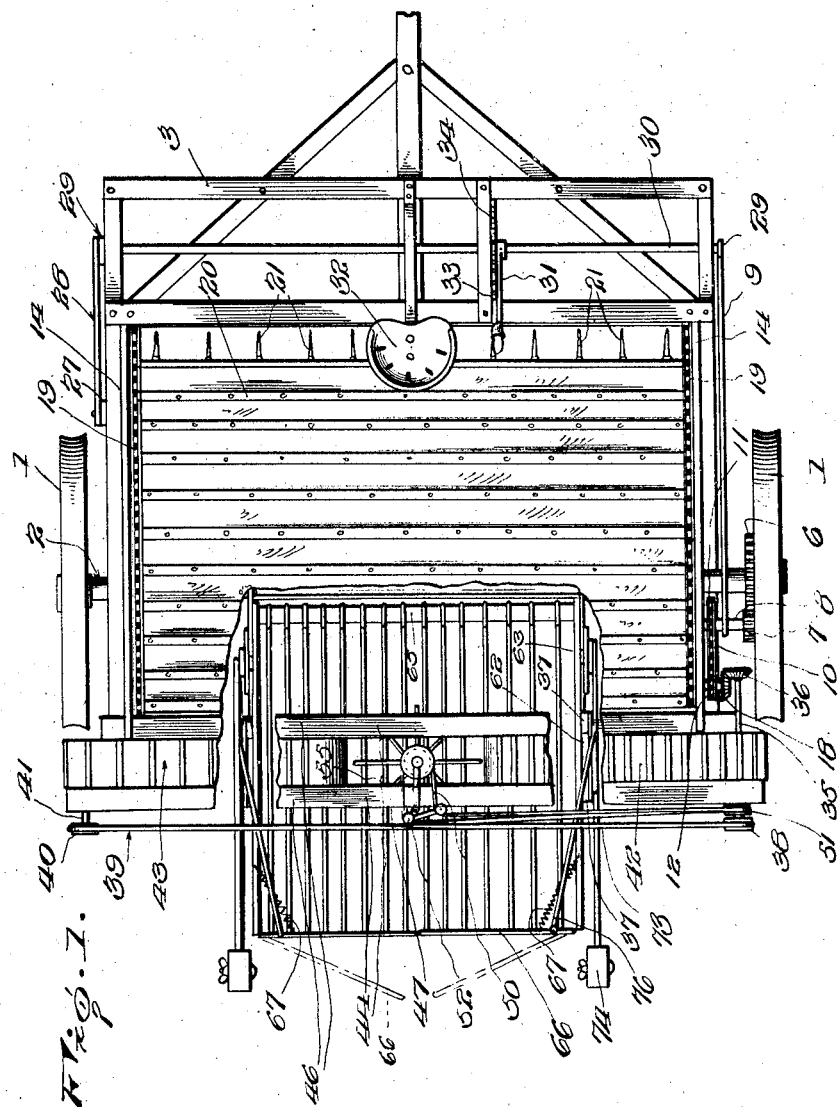

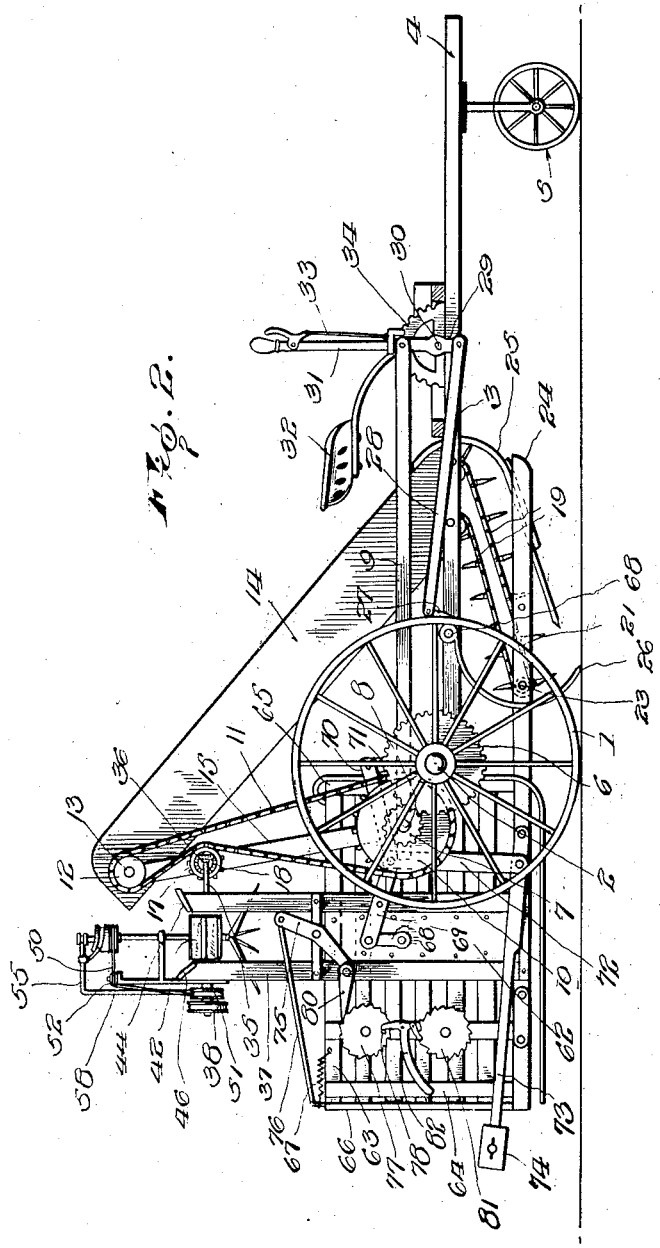

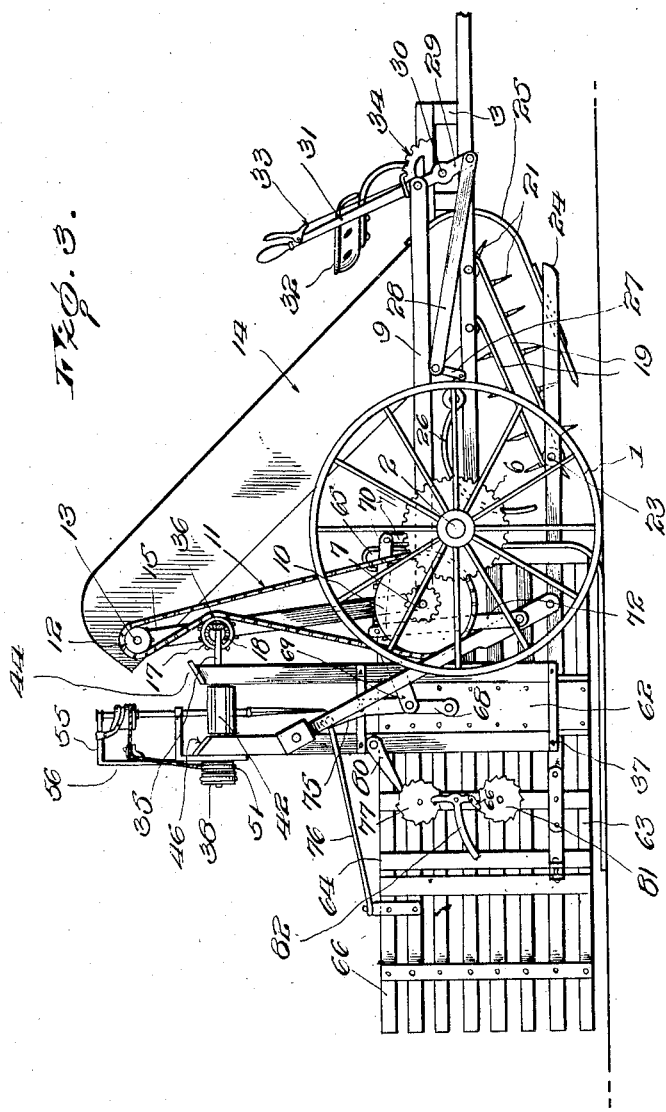

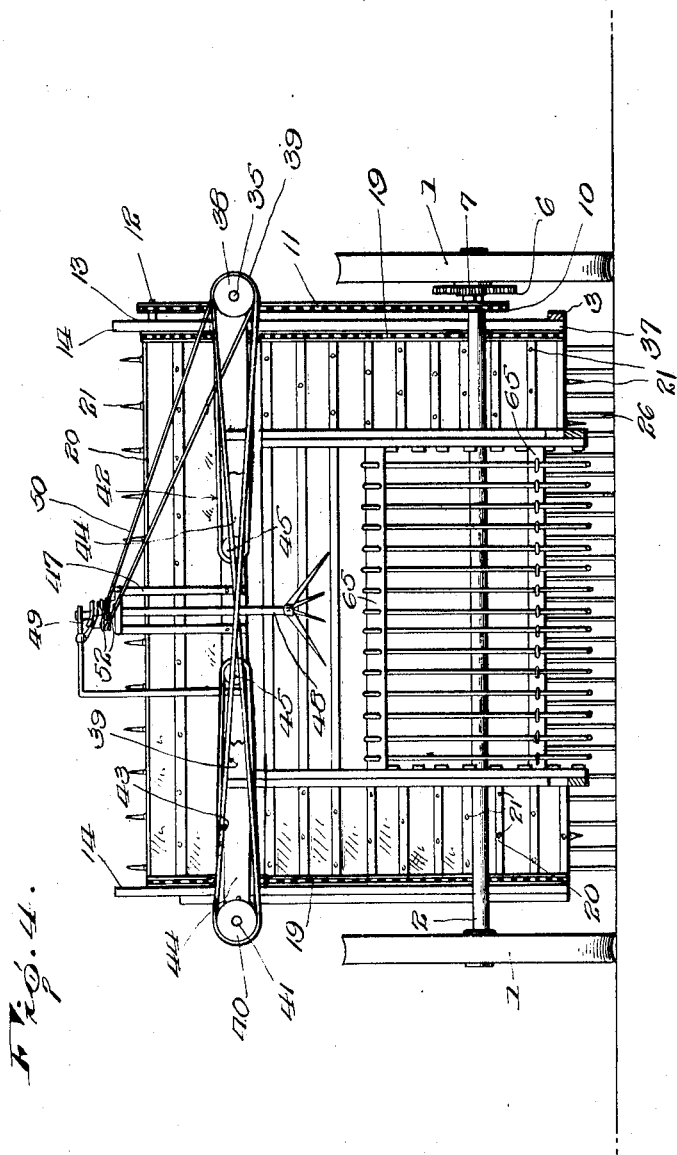

G. N. SPENCER.
AUTOMATIC HAY RAKE.
APPLICATION FILED JULY 31, 1919.
1,356,230.
Patented Oct. 19, 1920.
6 SHEETS—SHEET 6.
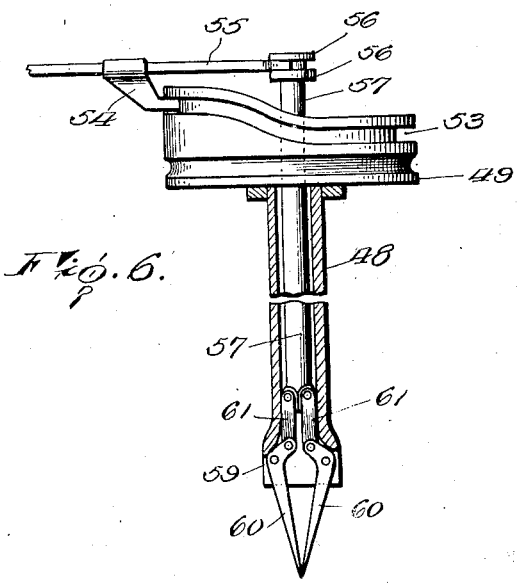
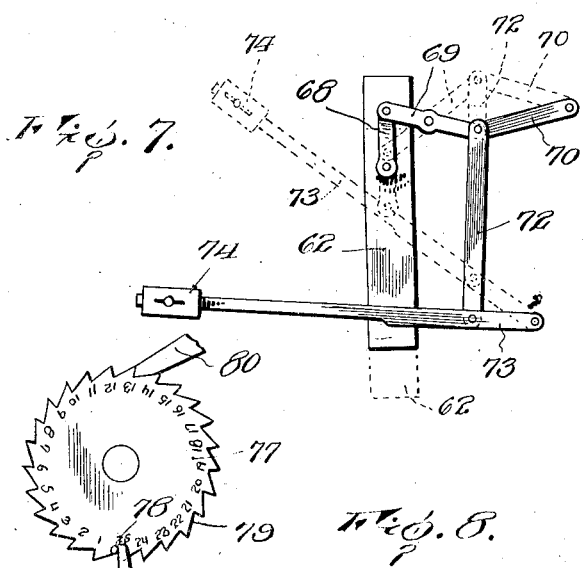
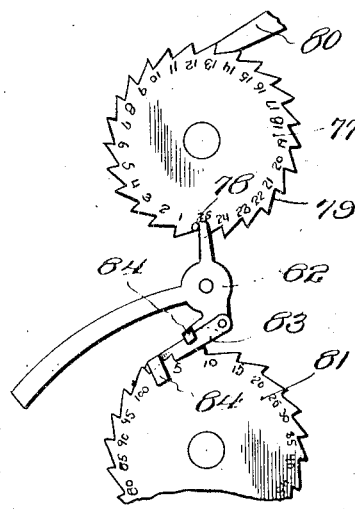
Inventor:
G. N. Spencer
by Lacy & Lacy
Attorneys

UNITED STATES PATENT OFFICE.

GEORGE N. SPENCER, OF FOREST GROVE, OREGON, ASSIGNOR OF ONE-HALF TO CHARLES J. CLARK, OF FOREST GROVE, OREGON.

AUTOMATIC HAY-RAKE.

1,356,230.  Specification of Letters Patent.  Patented Oct. 19, 1920.

Application filed July 31, 1919. Serial No. 314,401.

*To all whom it may concern:*

Be it known that I, GEORGE N. SPENCER, a citizen of the United States, residing at Forest Grove, in the county of Washington and State of Oregon, have invented certain new and useful Improvements in Automatic Hay-Rakes, of which the following is a specification.

One of the objects of my invention is to equip a vehicle with means for raking and stacking hay, depositing the stacks on the ground and registering the number of stacks deposited, the entire operation depending upon the movement of the vehicle. A further object is to provide a vehicle with a rake and with means for removing the hay from the rake, transferring the hay to a carrier, stacking the hay during said transfer and depositing the stack on the ground, the entire operation depending upon the movement of the vehicle. A still further object is to rake and form hay into stacks supported by a carrier adapted to deposit the stack on the ground and to remove the support from under the stack, instead of removing the chock from the support, to prevent the stacks from tumbling over.

With the above and related objects in view my invention comprises the means hereinafter described, an embodiment whereof is illustrated in the accompanying drawings, and embraced within the scope of the appended claims:

In the said drawings:

Figure 1 is a plan view of my improved hay gatherer, parts being broken away;

Fig. 2 is a side elevation thereof;

Fig. 3 is a view similar to Fig. 2 but showing the rake teeth in inoperative position and the stack carrier arranged to discharge the stack;

Fig. 4 is a rear elevation;

Fig. 5 is a central longitudinal section;

Fig. 6 is a detail of the spreader arranged in the stack-carrier;

Fig. 7 is a detail of a counterbalance mechanism for controlling the position of the stack carrier;

Fig. 8 is a detail of a portion of the tally mechanism.

Referring more particularly to the drawings, 1 represents a pair of wheels mounted on an axle 2 carried on a frame 3, to the front end of which is secured a draft tongue 4 preferably supported by a ground wheel 5. Mounted to revolve with one of the ground wheels 1 is a gear 6 in mesh normally with a pinion 7 on a shaft 8 carried by the rear end of a bar or pitman 9, said shaft having a sprocket 10 on its inner end. A sprocket chain 11 is trained around the sprocket 10 and around a sprocket pinion 12 on one end of the upper elevator shaft 13, said shaft being suitably journaled in the side plates 14 extending upwardly and rearwardly from the main frame 3. Standards 15 connect the frame 3 with the side plates 14 and one of the standards is provided with bearings for a shaft 16 carrying a sprocket and a beveled pinion 18, the sprocket 17 being engaged and actuated by the rear run of the chain 11, as shown in Fig. 2.

The elevator consists of endless chains 19 disposed parallel with and adjacent the inner sides of the side plates 14 and connected at intervals by transverse bars 20 having pins 21 projecting therefrom. The chains receive motion from sprockets on the elevator shaft 13 so that travel of the elevator is effected and the hay raised. The chains pass over idlers 22 located near the upper ends of the side plates 14 and at the lower ends of the same whereby the elevator is properly supported and guided, the lower portion of the elevator extending downwardly and rearwardly from the lower idlers 22 and being trained around and supported by the lower elevator shaft 23 journaled in and extending between the lower beams 24 of the main frame. To the lower front ends of the side plates 14, I secure a plate 25 which extends between said side plates and projects downwardly and rearwardly therefrom in proximity to the lower run of the elevator, as shown in Figs. 2, 3 and 5, the forward portion of this plate 25 constituting a hood and deflector to cover the advance portion of the elevator and direct the hay onto the supporting lifting portion of the elevator while the rear portion of the plate constitutes a runway up which the hay is pushed by the advancing teeth of the lower portion of the elevator. The rake teeth 26 are pivotally mounted on the frame 3 at a point above the lower rearwardly extending portion of the elevator and curve from their pivot around and under the end of the elevator in proximity thereto so that as the machine is drawn forward the hay will be taken up and will be pushed over to and onto the runway of the plate 25. The rake teeth are preferably of a well-known spring form and are secured to a pivoted bar or head at the ends of which are cranks 27 which are pivoted at their upper ends to the rear ends of pitmen 28. The front ends of the pitmen 28 are pivoted to the lower ends of cranks 29 at the ends of a rock shaft 30 journaled upon and extending across the front end of the main frame and manipulated through a hand lever 31 located near the driver's seat 32. The lever is equipped with the usual latch 33 to engage a segment 34 and hold the lever in a set position. One crank 29 is extended upward and the front end of the pitman 9 is pivoted thereto so that as the rake is raised the pinion 7 will be disengaged from the gear 6 and vice versa.

On the shaft 35 is mounted a bevel pinion 36 in mesh with the pinion 18, said shaft 35 being mounted on uprights 37 rising from the frame 3 and forming part of the support for the rear transverse conveyers. On the rear end of the shaft 35 is a pulley 38 for a crossed belt 39 running over a pulley 40 on a shaft 41 at the opposite side of the machine, the shafts 35 and 41 carrying drums or rollers constituting the driving members for the rear transverse conveyers 42 and 43 respectively. The said conveyers are endless aprons disposed between transverse beams 44 and the inner bights of said aprons are trained around idler drums or rollers 45 which are mounted in said beams at opposite sides of the longitudinal center of the machine, an open space being thus provided through which the hay may be dumped in to the stack-carrier. Deflecting rails 46 may be arranged above the beams 44 to guide the hay from the elevator onto the conveyers. At the center of the beams 44 I erect the supplemental frame 47 in which is journaled a vertical hollow shaft 48 passing through the space between the conveyers. On the hollow shaft is a pulley 49 around which is trained a belt 50 driven by a pulley 51 on the shaft 35 and guided by idlers 52 mounted on the frame 47. The pulley is also provided with a cam groove 53 which is engaged by a finger 54 on an arm 55, the end of which fits between a pair of collars 56 secured on a shaft 57 extending through the hollow shaft 48. The arm 55 extends laterally from the upper end of a rod 58 which is slidably mounted on one of the beams 44. The lower end of the shaft 48 is notched, as at 59, and in the notches are pivoted spreader arms 60, the inner ends of which are connected by links 61 to the lower end of the shaft 57. Between the uprights 37 are slides 62 which are secured to the sides of a stack carrier 63 constructed of slats which are held together by uprights 64 and cross bars 65. The bottom of the carrier is constructed of spaced horizontal rods free at their rear ends and bent upwardly at their front ends in advance of the lower cross bar 65 and carried over the upper cross bar 65. The rear of the carrier is provided with swinging doors or gates 66 hinged to its sides, springs 67 connecting the doors with the sides of the carrier and holding the doors normally closed. On each slide 62 is pivoted the lower end of a link 68 which is pivoted at its upper end to the rear end of a rocking arm 69 fulcrumed between its ends on the main frame. The front end of the arm 69 is pivoted to the rear end of a crank 70 mounted on a post 71 of the frame and a link 72 connects the arms 69 and 70 with a lever 73 fulcrumed at its front end on the frame and equipped at its rear end with an adjustable weight 74. A latch 75 is pivotally mounted on the frame above the carrier and has its upper end connected by a rod 76 with the door of the carrier. On one side of the carrier is rotatably mounted a toothed disk 77 provided with a pin 78 on its outer face near its edge. The teeth 79 of this disk is engaged by a dog 80 pivoted on the frame adjacent and in advance of the disk, as shown, and below the disk is a second similar disk 81, both disks bearing numerals on their outer sides adjacent their teeth whereby the movements of the disks may be counted. A three-armed lever 82 is fulcrumed on the side of the carrier between the tally disks, the upper arm of the lever projecting into the path of the pin 78 and the lower arm carrying a pawl 83 engaging the teeth of the disk 81, while the third arm extends rearwardly and serves as a counterbalance to hold the working arms in operative relation to the tally disks. A keeper bridge or hook 84 is carried by the lever and bears upon the pawl 83 to hold it to the disk 81 while a similar keeper 84 is provided at the free end of the pawl to span the edge of the disk and prevent relative lateral movement.

In operation the machine is drawn over the field with the rake teeth lowered, as shown in Fig. 2, the adjustable weight 74 having been set so that the carrier will be held elevated with the gates closed until the weight of the accumulated hay has reached the desired amount. As the machine is drawn forward the teeth will ride under the cut hay and will scrape it up to and against the pins 21 of the elevator, the result being that the hay will be thrust forward and rolled over upon the runway portion of the hood member 25. The continued travel of the machine will cause the hay to be pushed up the runway by the pins 21 and as it reaches the upper front portion of the hood it will be deflected so as to rest upon the elevator by which it will be carried upwardly and rearwardly and dumped upon the transverse conveyers 42 and 43. The conveyers 42 and 43 will be operated by the gearing shown and hereinbefore described so as to travel toward the center and the hay will, consequently, be carried to and discharged through the open space between the inner ends of the conveyers. By reason of the described connection between the hollow shaft 48 and the shaft 57 inclosed therein the two shafts will be caused to rotate together and the hay will be caught upon the outspread arms 60. The continued operation of the parts, however will cause the high part of the cam groove 53 to engage the finger 54 and the shaft 57 will thereby be lifted vertically so that the links 61 will pull upwardly against the innner ends of the arms 60 and they will be swung downwardly so as to drop the accumulated hay into the carrier. The hay will thus be permitted to settle so that each succeeding charge will be deposited directly upon the previously discharged hay and the same will be held in a stack instead of being scattered in its descent and spread within the carrier in a loose manner which will mitigate against its subsequent ready handling. When the low part of the cam groove 53 engages the finger 54 the shaft 57 will be moved downwardly and the arms 60 will then be spread so as to arrest the descent of the hay temporarily and the hay will thus be deposited in the carrier in successive charges. The carrier will normally be held in the raised position shown in Fig. 2 with the doors or gates closed. When the weight of the accumulated hay is equal to that for which the weight 74 has been set the resistance of the lever 73 to vertical movement of the carrier will be overcome and the carrier will then drop to the position shown in Fig. 3 whereupon the driver may throw the controlling lever 31 rearwardly so as to raise the rake teeth 26 and shift the pinion 7 out of engagement with the gear 6. The continued forward movement of the machine will then draw the carrier from around and under the stack so that it will be left in a standing position upon the ground. As the carrier descends the link 68 will be carried downwardly and the rocker arm 69 swung about its pivot so that a lifting pull will be exerted upon the lever 73 through the link 72 and the weight 74 will thereupon be swung upwardly to the position shown in Fig. 3, the lever 70 serving to impart steadiness to the movement and prevent the parts assuming a position which will lock them against return to normal. The pressure of the hay within the carrier against the doors or gates will overcome the force of the springs 67 so that the gates will swing rearwardly and permit the carrier to move from around the hay and as the gates or doors swing open they will exert a pull through the links 76 upon the latches 75 so that the latches will be swung to an approximately vertical position with their lower ends immediately over the rocker arms 69 and the links 68, as shown in Fig. 3, so that the gates will be held open and the carrier held against upward movement until the gates have cleared the stack, whereupon the springs 67 will return the said parts to closed position and the weights 74 will swing the lever 73 downwardly and thereby lift the carrier. Also as the carrier moves downwardly the tally disk 77 will move away from the horizontal plane of the dog 80 so that said dog may swing downwardly about its pivot. As the carrier then rises the free end of the dog, will, of course, be swung upwardly and in its upward movement it will also swing rearwardly about its pivot and thereby actuate the tally disk through a space equal to the distance between two successive teeth of the disk. When the tally disk 77 has made one complete revolution, the pin 78 thereon will be brought against the upper end of the free arm or lever 82 so that the next movement of the disk will swing the said arm about its pivot or fulcrum and the pawl 83 will be thereby caused to actuate the lower tally disk 81. As soon as the pin 78 has cleared the upper end of the lever 82 the rearwardly extending arm of said lever will return the same to its initial position, the tally disk 81 remaining stationary and the pawl 83 reaching forwardly over the same so that it will be in position to again actuate said disk when the upper tally disk has completed another revolution. It will thus be seen that the operator may readily ascertain the weight of the hay which has been gathered and deposited on the ground in stacks inasmuch as the tally disks will show the number of stacks deposited and it will be necessary merely to multiply that number by the weight of each stack.

It will be understood, of course, that the gathering of hay need not be interrupted during the operation of discharging a stack from the carrier inasmuch as the action of the carrier is so rapid that the amount gathered in the interval will be insufficient to make any material difference in the result shown by the tally disks. By throwing the controlling lever 31, however, rearwardly the operation of all the moving parts will be arrested and the machine may be drawn forward a few feet without picking up any hay and it will be noted that a single movement of the lever sets the rake teeth and also controls the gearing by which the hay elevating and conveying members are operated. The machine is very simple in the construction and arrangement of all its parts and its many advantages are thought to be evident.

Having thus described the invention, what is claimed as new is:

1. The combination with a vehicle, of a rake carried thereby adapted to pick up hay from the ground, means for lifting the hay off the rake, means for concentrating the hay, said lifting means adapted to transfer the hay to said concentrating means, a support, said concentrating means adapted to drop the hay centrally of the support, means adapted to stack the hay intermediate the concentrating and supporting means, means for lowering the support to permit of the stack coming in contact with the ground, and means for removing the support from under the stack, the entire operation depending upon the movement of the vehicle.

2. The combination with a vehicle adapted to rake hay, means to stack the hay comprising a series of radial arms, and means operable by the movement of the vehicle to rotate said arms and oscillate them in a plane intersecting the plane of rotation.

3. The combination with a vehicle, of a rake, means to stack hay comprising a hollow shaft, a shaft telescoped in said hollow shaft, a series of arms fulcrumed circumferentially on the hollow shaft and pivotally connected with the telescoped shaft, and means adapted during the movement of the vehicle to rotate said hollow shaft and to reciprocate the telescoped shaft.

4. The combination with a vehicle, of a rake, means to stack hay, a carrier to receive the stacks, a closure for the carrier, yieldable means normally holding the closure shut, the carrier being movable vertically to deposit a stack, and means actuated by the upward movement of the carrier to shut the closure.

5. The combination with a vehicle, of a hay stacker comprising a circular series of arms, and means depending upon the movement of the vehicle to rotate and rock said arms.

6. The combination with a vehicle, of a stacking device comprising a series of arms, a shaft provided circumferentially with fulcrums for the arms, a shaft connected with the first shaft to rotate therewith and pivotally connected with the arms, and means for reciprocating the second shaft.

7. In a hay gatherer, the combination with a carrier, of means for holding the carrier normally elevated, means controlled by the weight of the hay for lowering the carrier, and means for positively holding the carrier in its lowered position until complete discharge is effected.

8. In a hay gatherer, the combination with a hay carrier, of a closure therefor, means for holding the closure normally shut but yieldable to permit the closure to open, means for holding the carrier normally raised but operable to permit lowering of the carrier under a predetermined accumulation of hay, and means controlled by the closure for temporarily holding the carrier in its lowered position.

9. In a hay gatherer, the combination of a hay carrier movable downwardly under a predetermined accumulation of hay, means for raising the carrier and holding it normally raised, a closure for the carrier, yieldable means for holding the closure shut, and a latch operable by the opening movement of the closure to engage the carrier-raising means and holding the same inoperative until the hay is discharged.

10. In a hay gatherer, the combination of a carrier having a slide fitted in a supporting frame for vertical movement, a rocking arm fulcrumed between its ends upon the fixed support adjacent said slide, a link connecting one end of said rocking arm with said slide, a weighted lever fulcrumed upon the supporting frame in advance of said slide and below said rocking arm, and a link connecting said lever with the forward end of said rocking arm.

11. In a hay gatherer, the combination of a carrier movable vertically, a weighted lever fulcrumed adjacent the side of the carrier, a rocking arm fulcrumed between its ends above said lever, a link connecting the lever with the forward end of said rocking arm, a link connecting the rear end of the lever with the carrier, a closure for the carrier, a latch pivotally mounted above the last-mentioned link, and a rod connecting said latch with the closure whereby upon opening of the closure the latch will be caused to engage said last-mentioned link.

12. In a hay gatherer, the combination of a wheeled frame, a rake mounted upon said frame, an elevating conveyer mounted upon said frame in advance of the rake and having a downwardly and rearwardly extending portion, and a hood mounted upon the frame and having an upper portion extending across the conveyer and constituting a deflector, and a lower portion extending rearwardly below the rearwardly extending lower portion of the conveyer and constituting a runway.

13. In a hay gatherer, the combination of a wheeled frame, an elevator mounted thereon, means on the frame for actuating the elevator by the travel of the frame, a rake pivotally mounted upon the frame in position to coöperate with the lower portion of the elevator, and means on the frame to raise the rake and simultaneously move the elevator-operating means to inoperative position.

In testimony whereof I affix my signature.

GEORGE N. SPENCER. [L. S.]